United States Patent [19]
Blecharczyk

[11] 3,803,029
[45] Apr. 9, 1974

[54] MATERIALS PURIFICATION

[75] Inventor: Stephen S. Blecharczyk, Kingston, R.I.

[73] Assignee: Fram Corporation, East Providence, R.I.

[22] Filed: Oct. 8, 1969

[21] Appl. No.: 864,852

Related U.S. Application Data
[63] Continuation-in-part of Ser. No. 777,590, Nov. 21, 1968, abandoned.

[52] U.S. Cl. ............... 210/16, 210/17, 210/30, 210/33, 210/40
[51] Int. Cl. ............... C02c 1/04, C02b 1/14
[58] Field of Search ............... 210/3–8, 17, 210/39, 40, 80, 265, 33, 16, 30

[56] References Cited
UNITED STATES PATENTS

| | | | |
|---|---|---|---|
| 1,189,114 | 6/1916 | Irwin | 210/203 |
| 1,898,688 | 2/1933 | Rose | 210/39 X |
| 1,991,896 | 2/1935 | Hays | 210/17 |
| 2,477,815 | 8/1949 | Mallory | 210/6 |
| 3,078,188 | 2/1963 | Assalini | 2110/80 X |
| 3,231,324 | 7/1966 | Young | 210/39 X |
| 3,232,434 | 2/1966 | Albertsmeyer | 210/17 X |
| 3,244,621 | 4/1966 | Bouthilet | 210/39 X |
| 3,337,454 | 8/1967 | Greuenwald | 210/80 X |
| 3,442,798 | 5/1969 | Schoeffel et al. | 210/40 |
| 3,455,820 | 7/1969 | Joyce et al. | 210/80 X |

FOREIGN PATENTS OR APPLICATIONS

| | | | |
|---|---|---|---|
| 324,632 | 12/1902 | France | 210/40 |

OTHER PUBLICATIONS

Rudolfs, W. et al., Activated Carbon in Sewage Treatment, Sewage Works Journal, Vol. 17, Sept. 1935, pp. 852, 863 and 880 relied on.

Babbitt, H. E., Sewerage and Sewage Treatment, Sixth Edit., 1947, John Wiley & Sons, New York, pp. 454 and 455 relied on.

*Primary Examiner*—Samih N. Zaharna
*Assistant Examiner*—Thomas G. Wyse

[57] ABSTRACT

Process of biologically treating waste material in which adsorbent is employed to accelerate the rate of biological degradation while micro-organisms in turn biologically regenerate the adsorbent for re-use.

16 Claims, 6 Drawing Figures

MATERIALS PURIFICATION

This application is a continuation-in-part of U.S. Pat. application Ser. No. 777,590, filed Nov. 21, 1968, now abandoned.

This invention relates to material purification, such as the treatment of organic waste by biological degradation with microorganisms (e.g., in activated sludge).

A primary object of the invention is to provide for extended use of adsorbent material in the presence of organic impurities. Other objects are to improve the efficiency of conventional activated sludge waste treatment; to provide for simple and economic treatment of industrial or municipal waste (interchangeably or simultaneously); and to provide a simple, reliable, and economical waste treatment system particularly suitable for reducing to acceptable pollutional levels the color, B.O.D., and suspended solids found in textile finishing wastes, or other wastes in which the concentration of soluble organic pollutional materials is high, all without a solids disposal problem.

The invention features use of a quantity of a particulate adsorbent to adsorb from a liquid medium organic impurities in an amount greater than the adsorptive capacity of the adsorbent, and, either simultaneously with said adsorption or intermittently between adsorption cycles, reactivating the adsorbent by biologically degrading adsorbed impurities. In preferred embodiments raw waste (raw in the sense that it contains organic impurities in an amount which, over the intended cycle of use, would saturate the adsorbent without reactivation) is fed to a fixed bed of adsorbent; the adsorbent is periodically reactivated by directing aerated activated sludge up into the bed in such a way as to partially fluidize the adsorbent; the bed is maintained between, and fills less than the volume enclosed by, two perforated walls having 18 – 40 percent open space with perforations not greater in size than the average adsorbent particle size; and the liquid medium to be treated passes downwardly through a series arrangement of fixed beds during the treatment mode, and the sludge is circulated upwardly through the same beds arranged in parallel during the reactivation mode. In preferred embodiments for water purification the beds are flushed with pure water after reactivation. In other preferred embodiments anaerobic reactivation of the adsorbent occurs during flow of the liquid medium in the treatment mode; and waste flow is upward through a first bed, and, after passage through an aeration zone for controlling methane production, upward through a screen supported bed. In still other preferred embodiments activated sludge, activated carbon, and the liquid medium to be treated are mixed, liquid is separated therefrom, and the solids portion of the waste, together with adsorbed liquids, are thereafter degraded under aeration by the sludge; and the sludge and adsorbent, having been thus reactivated, are returned to treat a new charge of organic impurities.

Other objects, features, and advantages will appear from the following description of preferred embodiments of the invention, taken together with the attached drawings, in which.

Figure 1:
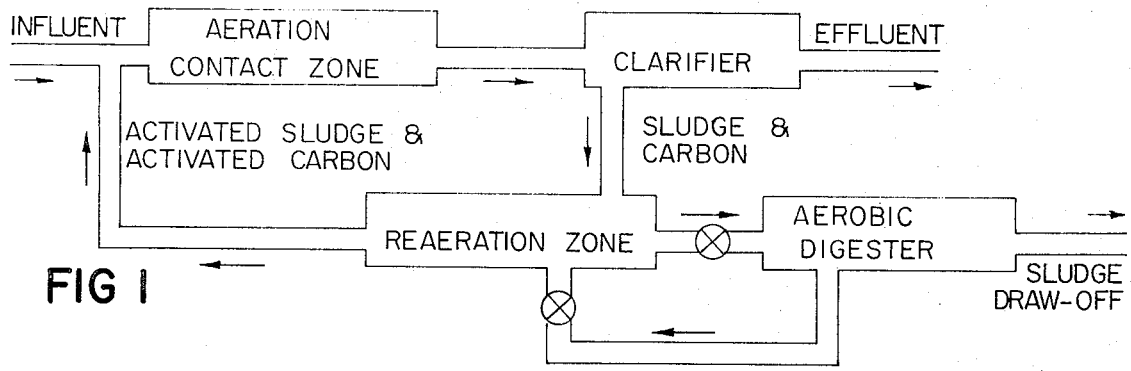
FIG. 1 is a flow chart illustrating one preferred embodiment of the invention.
Figure 2:
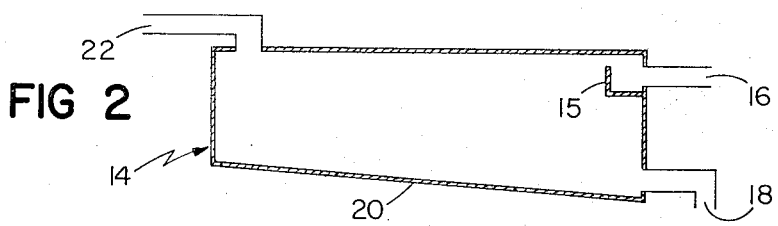
FIG. 2 is a diagrammatic view of a vessel for use in a waste treatment process, such as in the embodiment of FIG. 1.

Referring first to FIG. 1, there is shown a flow chart for a continuous waste treatment process. The influent waste material, mixed with activated sludge and adsorbent, enters the "aeration contact zone" which may be a large open tank through which sufficient air is bubbled, such as through the bottom, merely to prevent the formation of significant odors, but insufficient to initiate biological digestion of the waste. The influent waste may be, e.g., largely soluble materials obtained by presettling the raw waste in a holding tank and drawing off the supernatant liquid. Or, the influent waste may be a heavy liquor including both soluble and comminuted solid organic waste. Also present in the aeration contact zone are activated sludge and an adsorbent, such as activated carbon. The waste is maintained in this zone until colloidal matter is adsorbed (about one-half hour), soluble organics being adsorbed by both the sludge and the activated carbon, but not long enough to enable substantial digestion of these organics by the sludge. The liquor is then transferred to the "clarifier," which is simply a settling tank which, advantageously, is shaped like vessel 14 shown in FIG. 2. The effluent or supernatant liquid is drawn off, from vessel 14, past barrier 15, through outlet 16, whereas the adsorbent and sludge are drawn off through outlet 18, located at the lower end of sloped lower wall 20. Flow into vessel 14 is through liquid inlet line 22. Normally, the adsorbent material will settle most readily, so that negligible quantities remain suspended for passing over this barrier and through outlet 16. If the waste spends too long in the aeration contact zone, settling becomes more difficult and more sludge will be lost (probably because of the increased sludge activity).

The adsorbent and activated sludge, carrying adsorbed and otherwise entrained organic wastes, are then fed to the "reaeration zone," which advantageously is a somewhat larger tank than that used to provide the aeration contact zone. Air (oxygen) is bubbled into the reaeration zone at a rate and in an amount sufficient to complete digestion of the entrained materials, forming either gas (predominantly $CO_2$) or more sludge. It has been found that the use of an adsorbent inhibits sludge formation, probably due to a controlled feed of adsorbed organics from the adsorbent to the sludge, which consequently enables regulation of the sludge level and constant recirculation of the sludge and adsorbent without constant sludge removal.

When the activated sludge does begin to accumulate in the system, the "aerobic digester" may be connected to the reaeration zone, through an appropriate valve, and sludge drawn off from the reaeration zone to the aerobic digester. The outlet from the reaeration tank to the digester should be placed above the adsorbent level, so that substantially only sludge and associated liquor will be drawn off, the adsorbent remaining in the reaeration zone. This digester typically takes the form of a holding tank, to which quantities of oxygen are introduced suffient to allow complete digestion by the sludge plus auto-oxidation, resulting in the destruction of much of the sludge. The remaining supernatant liquid from the digester may be reintroduced into the reaeration zone, an appropriate conduit and valve being provided if it is desired to lower the solids to liquid ratio of the system. Or, the supernatant may be mixed with effluent leaving the clarifier, since it is of comparable purity. In municipal systems, where the load of waste is not constant, the digester might work continuously during certain peak hours, and only intermittently during other times of the day.

cent reduction values listed below in Table 1 are average values obtained from composite samples of each COD. The values shown for suspended solids are for activated sludge solids only. The COD was measured by the standard chromic acid oxidation method set forth in "Standard Methods for the Examination of Water and Waste Water" (American Public Health Association, twelfth Ed.).

Table II lists the results obtained from treating samples of the same COD with activated sludge alone, without any activated carbon.

TABLE 1 (Sludge & Activated Carbon)

| Influent Waste COD, mg/l | | Detention Time, hr. | | Suspended Solids, ppm | | % COD Reduction | |
|---|---|---|---|---|---|---|---|
| Total | Soluble | Aeration Contact Zone | Reaeration Zone | Aeration Contact Zone | Reaeration Contact Zone | Total | Soluble |
| 760 | 220 | 0.5 | 2.0 | 2000 | 4500 | 92 | 96 |
| 685 | 130 | 0.3 | 1.5 | 2500 | 5200 | 94 | 96 |

TABLE II (Sludge Only)

| 760 | 220 | 0.6 | 4.5 | 2900 | 6700 | 78 | 62 |
| 685 | 130 | 1.0 | 3.5 | 3400 | 7600 | 86 | 64 |

In the reaeration zone, the biodegradable adsorbed materials in the adsorbent are digested by the activated sludge, and hence the adsorbent is reactivated with restored adsorptive potential. The mixture of activated sludge and activated adsorbent is then reintroduced to the aeration contact zone, together with a new charge of waste material.

Thus, substantially all the adsorbent material originally present in the aeration contact zone is returned to the aeration contact zone, the only possible adsorbent losses being at the clarifier, where some negligibly small amount may fail to settle, and at the aerobic digester, where some negligibly small amount may be removed with the sludge.

EXAMPLE 1

The system illustrated in FIG. 1 was used to treat raw waste (a mixture of sanitary and industrial waste obtained from the East Providence, Rhode Island treatment plant) which contains approximately 30 per cent industrial wastes with a high concentration of dissolved organics. Granular activated carbon (Witco Grade 718, 12 × 30 mesh, manufactured by the Witco Chemical Co., New York, New York) was added to the sludge in a carbon to sludge weight ratio of one. This large quantity of carbon was used because daily COD ("Chemical Oxygen Demand," i.e., the theoretical measure of oxygen needed for the chemical oxidation of the organics in the waste, expressed as a weight of oxygen per unit volume) variations from 400 mg/liter to greater than 1,200 mg/liter are frequently encountered within any 8 hour operating period when industrial wastes are being received. The return (from the reaeration zone) activated sludge and carbon were premixed with the influent waste, under somewhat turbulent conditions, prior to entering the aeration contact zone. 100 per cent recycle of the regenerated activated sludge and carbon was used, no solids being diverted to the aerobic digester.

The results of this treatment are set forth in Table 1, below, for two different COD's. The influent and per As can be seen, even though more sludge was present in Table II than in Table I, the sludge-adsorbent mixture resulted in a remarkable reduction in soluble COD, and a very large reduction in total COD. Moreover, a comparison of the suspended solids accumulated in the reaeration zone indicates that the sludge accumulation has been considerably lessened where the sludge-adsorbent mixture was employed. Because of the decreased amount of sludge solids necessary and accumulated a considerable reduction in equipment size may therefore be accomplished. Moreover, it is not necessary to employ, e.g., the aerobic digester as often as is necessary when the activated sludge alone is used.

Figure 3:
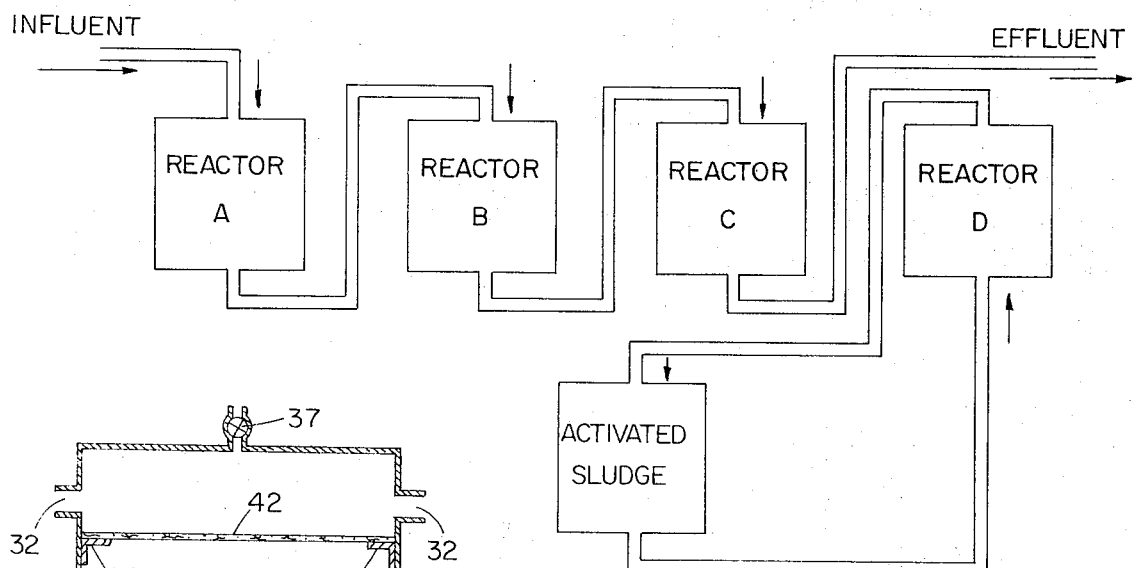
FIG. 3 is a flow chart illustrating a representative operational cycle of another preferred embodiment of the invention.

FIG. 3 illustrates a second embodiment of the invention, in which influent is passed down through one or several of a series of reactors A, B, C, D. Advantageously, each reactor is of the design shown in FIG. 4, and comprises a tank 30 (which may be rectangular, cylindrical, conical, etc) having waste inlet ports 32, waste outlet ports 34, an oxygen inlet port 36, and an air eliminator valve 37, which allows passage of gas, but not of liquid, out of the reactor.

Bracket pairs 38, 40 support two identical perforated members 42 for holding a packed column of adsorbent therebetween. This column of adsorbent advantageously does not fill the volume between the members.

These perforated members are preferably made of perforated sheet (rather than a woven screen) which permits a rapid liquid flow through the adsorbent column. Perforated members having at least about 18% and not more than about 40 percent open space provided by uniformly spaced perforations are particularly useful for promoting essentially clogging-free rapid waste treatment. The size of the perforations should not be greater than the average size of the particles.

Referring again to FIG. 3, in the representative operational cycle of the reactors shown, column D is connected to a source of activated sludge which is under constant aerobic agitation to maintain the sludge active. The oxygen is bubbled in, through inlet 36, in a sufficient amount to permit complete biological degradation of materials adsorbed by the packed adsorbent. The adsorbent in reactor D is reactivated by passing sludge up through the lower perforated member, through the adsorbent, at a rate sufficient to fluidize the adsorbent in the volume between the perforated members and thereby allow overall contact between adsorbent and sludge. This fluidizing of the adsorbent is made possible by providing a space between the packed adsorbent and the uppermost perforated member. Where the perforated members have perforations equal to the average size of adsorbent, even where the adsorbent used includes a large number of particles of smaller size than the perforations, no more than negligibly small amounts of adsorbent are removed from the reactor with the sludge. Similarly, liquid waste passage down through the column also causes no more than a negligible loss of adsorbent. Thus, substantially all the adsorbent is reactivated and remains in the column for reuse. The sludge-adsorbent contact is continued until all the adsorbed materials are digested by the sludge, thus reactivating the adsorbent. Reactor D is then shut off from the activated sludge, and, if desired, is then connected up to the waste inlet in lieu of one of reactors A, B, or C which, as shown, are connected in series to a source of waste. Unlike the activated sludge in the reactivation cycle, the incoming waste passes down through each reactor under sufficient pressure to fill the reactor, in the presence of sufficient oxygen (e.g., by bubbling oxygen through the reactors), to cause degradation of organic impurities in the column.

The adsorbent, after treatment with the activated sludge, will retain a large amount of sludge both on its surface and entrained between adjacent adsorbent particles. The net result is an activated sludge-adsorbent mixture for treating incoming waste, such as described with reference to FIGS. 1 and 2, which is constantly aerated through inlet 36. The surface of the adsorbent is also believed to aid in degradation by providing "sites" at which biological activity may take place. In addition, when packed in a column, the adsorbent will also serve as a filter medium, so that most waste solids will not pass with the effluent to the packed adsorbent column in the next reactor. After passage through three (or a lesser or greater number, depending on the nature of the waste, the desired efficiency, etc.) packed adsorbent columns, only a negligible amount of solids will remain in the effluent.

Where the incoming waste is mostly sanitary waste, the adsorbent will be continually reactivated in its packed column, with proper flow rate adjustment and dissolved oxygen level, and hence need not be often disconnected from the waste inlet and contacted with the activated sludge of the reservoir. During peak periods (e.g., in a municipal waste system), however, the buildup of sludge in the column and the buildup of adsorbed organics in the adsorbent will necessitate periodically disconnecting each reactor from the incoming waste and connecting it instead to the activated sludge reservoir. If sludge buildup in the reservoir becomes excessive, an aerobic digester, such as described in FIG. 1, may be provided for periodic reduction of the solids content of the reservoir sludge.

Where the raw waste is primarily industrial, the reasons for the activated sludge reservoir may be the reverse, namely the microorganism content of the column may be too low to permit in situ reactivation of adsorbent. Thus, additional microorganisms must be supplied by adding sludge periodically from the activated sludge reservoir. Advantageously, nitrogen or phosphorous may also be added to the column to promote the growth of sludge.

The adsorbent columns are particularly useful in the handling of industrial wastes. Because much of the soluble organic material is adsorbed by the adsorbent and slowly fed to the sludge for digestion, the sludge is given sufficient time to become biologically acclimated to the organics in the waste, resulting in more efficient degradation. Thus, the large slug doses of organic materials frequently found in industrial waste, and capable of destroying the sludge if fed in a single dose, are removed immediately in large part by the adsorbent and slowly refed to the sludge, allowing sufficient time for biological acclimation.

EXAMPLE 2

Figure 4:
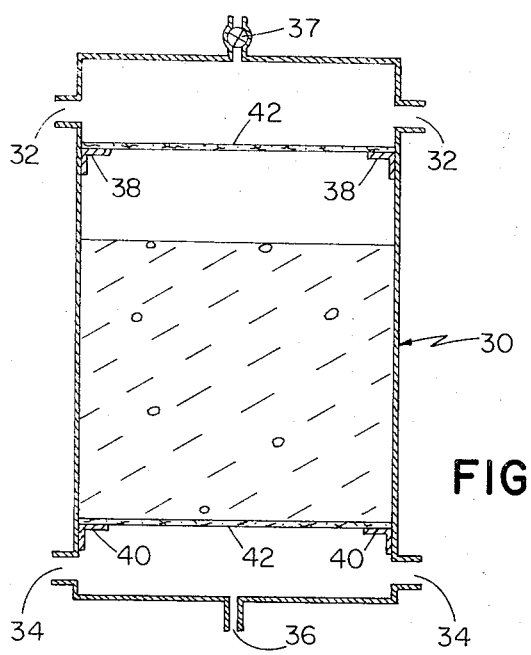
FIG. 4 is a vessel for use in the embodiment illustrated in FIG. 3.

Using the system described in FIGS. 3 and 4, a synthetic waste was treated for longer than 10 months using the same activated carbon without a loss in removal efficiency.

The adsorbent columns used were six feet in length, two inches in diameter and were packed with 1,200 grams per column of Witco Grade 718 (12 × 30 mesh) granular activated carbon. The carbon was restrained using a perforated screen with 0.045 inch diameter holes in a staggered fashion, having 26 per cent open area. Flow rate through the system was maintained at 12 gallons per minute per square foot of cross sectional area.

The reactivation cycle from the activated sludge reservoir was carried out with up-flow at 10 gallons per minute per square foot of cross sectional area. Sufficient oxygen was bubbled up through each reactor both during the reactivation cycle and during waste treatment to maintain the dissolved oxygen level at greater than 2 ppm. The system utilized activated sludge obtained from a nearby waste treatment plant which, as used in the regeneration system, had a solids content of less than 1,000 milligrams per liter and generally less than 200 milligrams per liter.

The synthetic waste contained the following materials and had a COD of 295 milligrams per liter:

| | |
|---|---|
| Starch, soluble | 39.4 mg/l |
| Glucose | 39.4 mg/l |
| Glycine | 31.0 mg/l |
| Nutrient broth (Dehydrated, No. J-1089-C, manufactured by Fisher Scientific Co., Pittsburgh, Pa.) | 31.0 mg/l |
| Leucine | 31.0 mg/l |
| Glycerine | 5.5 mg/l |
| Octanoic acid | 5.5 mg/l |
| Oleic acid | 5.5 mg/l |
| Hydrated sodium acetate ($NaC_2H_3O_2 \cdot 3H_2O$) | 5.5 mg/l |

With three such columns in series at the above described conditions, the COD removal efficiency was maintained at between 46 and 58 per cent, the average being about 51 per cent. The rate of removal can, of course, be increased by decreasing the flow rate or increasing the column length, or both.

The apparatus and process described in FIGS. 3–4 may be used for other purification processes, such as water purification. For such a use, the adsorbent columns would again be periodically activated with activated sludge. However, for use in water purification, the columns would preferably be flushed after each activation cycle to remove activated sludge therefrom.

Adsorbent materials, for use in this invention, in addition to being chemically inert to the surrounding medium (and insoluble therein) should be particulate in form, presenting a large surface area to the incoming waste and thus providing a large number of reaction sites and a high rate of adsorption. Best results have been obtained with adsorbents which also readily settle out from the surrounding medium, where the process used requires solids separation. Where a packed column is employed, the particles should be large enough to enable the use of a screen size consistent with the desired rapid liquid flow through the system. Activated carbon, either in granular or powdered form, is a particularly advantageous adsorbent, the granular form being preferred for ease in settling and rapid liquid flow, although having a lesser total surface area, per unit weight, than the powdered form. Activated carbon above about $20 \times 40$ mesh may be considered "granular," and below $20 \times 40$ mesh "powdered."

A further advantage for the use of adsorbents is in the treatment of non-biodegradable organics found in waste, such as the alkyl benzene sulfonates (ABS). In such a case, the waste may be separately treated with adsorbent alone prior to being treated with sludge. After adsorption of these materials, the adsorbent may be removed and contacted with an oxidizing agent of a strength and for a time sufficient to convert the adsorbed non-biodegradables into biodegradable materials. The adsorbent is then reintroduced into the activated sludge system, and biodegradation carried out. Such a procedure would not have been possible in systems using only activated sludge, since the other more easily oxidized materials in the sludge would have reacted with the oxidizing agent, leaving the non-biodegradables intact.

Figure 5:
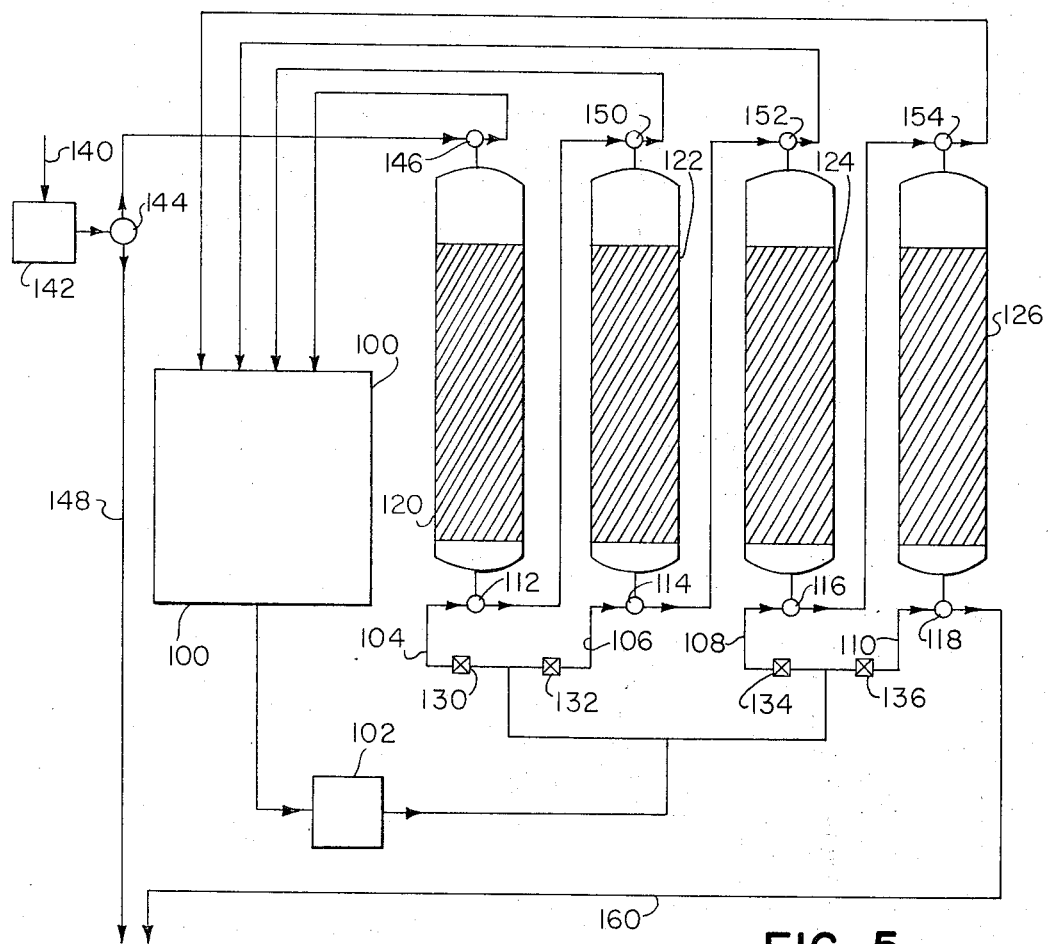
FIG. 5 is a schematic diagram of another embodiment.

FIG. 5 illustrates another embodiment, particularly useful for treating textile wastes. Sludge tank 100 is connected through pump 102 and parallel lines 104, 106, 108, and 110, to three way valves 112, 114, 116, and 118, respectively at the bottom ports to adsorption columns 120, 122, 124, and 126. Each column is as described in connection with FIG. 4. Lines 104–110 respectively include flow control valves 130, 132, 134, and 136.

Waste inlet line 140 is connected through pump 142 and three way valve 144 to three way valve 146 at the top port of column 120, and to by-pass line 148. Three way valves 150, 152, and 154 at the top ports of columns 122, 124, and 126, are respectively connected to valve 112, 114, and 116. Each valve 146, 150–154 is additionally connected to tank 100. Separate air inlet and outlet ports (not shown) are respectively provided at the bottom and top of each of tank 100 and columns 120–126. Valve 118 is connected to treated effluent line 160.

In operation, with the valves appropriately positioned, waste input is pumped downwardly through each of columns 120–126 in series during the treatment mode. During the regeneration cycle sludge is pumped upwardly through columns 120–126 in parallel, providing effective biological degradation of impurities adsorbed by the carbon, while minimizing the depletion of the dissolved oxygen in the sludge. Separate regeneration of any column is also possible. Aeration is carried out as needed to maintain biological activity. As a result of the regeneration over a period of time the amount of organic impurities adsorbed by the carbon exceeds the adsorbtive capacity of the carbon.

Figure 6:
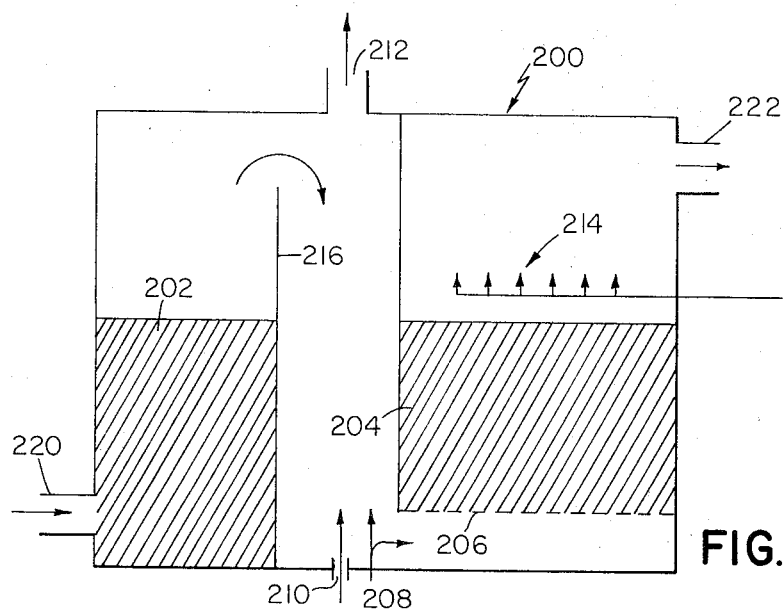
FIG. 6 is a schematic diagram of yet another embodiment.

In the embodiment of FIG. 6 tank 200 is partitioned to provide a bed 202 of activated carbon, unconfined at its top, and a second bed 204 of activated carbon supported above the floor of the tank on screen 206. A flow channel 208 extends between the two beds and beneath bed 204, and has air inlet 210 and outlet 212 between the beds. Air nozzles 214 are above bed 204. Channel 208 communicates with the top of bed 202 over partition 216. Waste inlet 220 is near the bottom of bed 202, the effluent port 222 above bed 204. In operation waste influent (e.g., domestic waste, containing suspended organic solids and bacteria) flows upwardly through bed 202, some solids being filtered out and retained in the bed, liquid impurities being adsorbed. Concurrently with that filtration and adsorption, anaerobic degradation of the filtered and adsorbed impurities occurs, thereby regenerating the adsorptive capacity of the carbon, solubilizing some of the retained solids, and reducing the particle size of the remaining solids. The bed can expand upwardly to free itself of large solids. As flow continues through channel 208 aeration occurs, to limit the production of methane incident to anaerobic degradation. Bed 204 functions similarly to bed 202, but the increased presence of oxygen causes the biological degredation to be partly aerobic. The solids are of sufficiently small particle size to avoid plugging of screen 206. The aeration above bed 204 maintains an aerobic effluent.

If the rate of biological degradation in beds 202 and 204 is less than that of contamination, it may be necessary to intermittently operate tank 200 in a regeneration cycle, by either completely aerating the beds, or recirculating oxygen saturated water.

Other embodiments will occur to those skilled in the art and are within the following claims.

What is claimed is:

1. In a process of biological degradation of industrial or municipal waste material having high chemical oxygen demand and comprising a liquid medium with a substantial concentration of organic pollutants therein, said process including the step of feeding said pollutants to micro-organisms to eliminate substantially a major portion of said chemical oxygen demand, that improvement comprising increasing the efficiency of said process by contacting said waste material with a quantity of particulate adsorbent prior to completion of said degradation, effectively exposing said adsorbent to said organisms to free said adsorbent of pollutant adsorbed during said contacting, thereby contributing to said degradation, and thereafter repeatedly contacting substantially all said same adsorbent with additional quantities of said waste material, and repeatedly exposing said same adsorbent to said organisms, without the addition of additional quantities of said adsorbent, at least until the total amount of pollutant ultimately so adsorbed and degraded exceeds the original adsorptive capacity of said same adsorbent.

2. The process of claim 1 wherein said contacting occurs at least in part while said adsorbent is effectively exposed to said organisms.

3. The process of claim 2 wherein said micro-organisms are supplied at least in part as part of said waste material.

4. The process of claim 1 wherein said adsorbent is granular activated carbon.

5. The process of claim 1 wherein said adsorbent is formed in a fixed bed to which raw waste is fed, and fluid is passed upwardly through said bed while said microorganisms are at said sites, to loosen said bed by fluidization.

6. The process of claim 5 wherein said fluid carries activated sludge.

7. The process of claim 1 wherein said waste is passed downwardly through a plurality of fixed beds of said adsorbent in series during a treatment mode, and a fluid carrying said micro-organisms is passed upwardly through said beds in parallel during a reactivation mode.

8. The process of claim 1 wherein said waste is passed upwardly through a plurality of fixed beds of said adsorbent in series, said beds being separated by an aeration zone, said adsorbent being reactivated by anaerobic degradation.

9. The process of claim 1 wherein said waste material includes sewage.

10. A process of biologically degrading industrial or sanitary waste material having a high chemical oxygen demand and comprising a liquid medium having a substantial concentration of organic pollutants therein, comprising the steps of contacting said waste material with a mixture of micro-organisms and a particulate adsorbent over a period of time sufficient to cause said adsorbent to remove from said liquid medium a quantity of said pollutants in excess of the adsorptive capacity of said adsorbent and to cause said micro-organisms to degrade said pollutants at an average rate exceeding the capability of said micro-organisms in the absence of said adsorbent, to thereby biologically eliminate at least a major portion of said chemical oxygen demand, effectively exposing said adsorbent to said micro-organisms to free said adsorbent of said pollutants adsorbed during said contacting, thereby contributing to said degradation and biologically regenerating said adsorbent for re-use, and re-using substantially all of the regenerated adsorbent for said contacting during said period of time, without the addition of additional quantities of said adsorbent.

11. The process of claim 10 wherein said mixture is of activated sludge and activated carbon, and oxygen is supplied thereto to promote the degradation of said removed pollutants and to maintain said sludge in biologically active condition.

12. The process of claim 11 wherein said carbon is powdered.

13. The process of claim 11 wherein said carbon is granulated.

14. The process of claim 11 wherein said waste material is initially contacted with said mixture in a first chamber, said degradation occurs in a second chamber after separation of said clarified effluent, and said mixture is recirculated to said first chamber after said degradation.

15. The process of claim 11 operated on a continuous basis.

16. The process of claim 11 wherein said waste material is mixed with said mixture under turbulent conditions.

* * * * *